US012613636B2

(12) United States Patent
Zha et al.

(10) Patent No.: US 12,613,636 B2
(45) Date of Patent: Apr. 28, 2026

(54) STORAGE SYSTEM, REQUEST PROCESSING METHOD, AND SWITCH

(71) Applicant: Huawei Technologies Co., Ltd., Shenzhen (CN)

(72) Inventors: Wei Zha, Shenzhen (CN); Changjun He, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 649 days.

(21) Appl. No.: 17/940,222

(22) Filed: Sep. 8, 2022

(65) Prior Publication Data

US 2023/0004304 A1     Jan. 5, 2023

Related U.S. Application Data

(63) Continuation of application No. PCT/CN2020/114222, filed on Sep. 9, 2020.

(30) Foreign Application Priority Data

Mar. 9, 2020    (CN) .......................... 202010159006.9
Jun. 19, 2020    (CN) .......................... 202010568783.9

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC ..... G06F 3/0613; G06F 3/0659; G06F 3/0673
See application file for complete search history.

(56) References Cited

U.S. PATENT DOCUMENTS

| | | | | |
|---|---|---|---|---|
| 9,507,720 | B2 * | 11/2016 | Yu | ............................ G06F 3/067 |
| 10,545,667 | B1 * | 1/2020 | Magerramov | ........ G06F 3/0607 |
| 11,321,021 | B2 * | 5/2022 | Luo | ........................... G06F 3/067 |
| 11,436,157 | B2 * | 9/2022 | Luo | ....................... G06F 16/156 |
| 11,614,867 | B2 * | 3/2023 | Feng | ................... H04L 67/1051 |
| | | | | 707/609 |
| 11,762,555 | B2 * | 9/2023 | Yang | ................... G06F 11/2094 |
| | | | | 711/114 |
| 11,762,741 | B2 * | 9/2023 | Takubo | ............... G06F 11/1417 |
| | | | | 714/19 |
| 12,038,851 | B2 * | 7/2024 | Luo | ....................... G06F 12/0822 |
| 12,346,589 | B2 * | 7/2025 | Luo | ....................... G06F 3/0631 |

(Continued)

FOREIGN PATENT DOCUMENTS

| | | |
|---|---|---|
| CN | 103795570 A | 5/2014 |
| CN | 104135539 A | 11/2014 |

(Continued)

*Primary Examiner* — Michael A Keller
(74) *Attorney, Agent, or Firm* — Conley Rose, P.C.

(57)     ABSTRACT

A storage system includes a switch and a plurality of storage nodes. The switch is configured to receive a first request from a client. The first request includes an identifier of a storage partition. The switch queries an entry in a forwarding table based on the identifier to determine a target storage node in the plurality of storage nodes. The entry includes a mapping relationship between the identifier and the target storage node. The switch sends the first request to the target storage node. The target storage node is configured to receive the first request from the switch.

20 Claims, 5 Drawing Sheets

(56) References Cited

U.S. PATENT DOCUMENTS

| | | | | |
|---|---|---|---|---|
| 2015/0106420 | A1 | 4/2015 | Warfield et al. | |
| 2015/0106578 | A1 | 4/2015 | Warfield et al. | |
| 2017/0111450 | A1 | 4/2017 | Zhou | |
| 2017/0336998 | A1* | 11/2017 | Gu | G06F 3/0632 |
| 2018/0212875 | A1* | 7/2018 | Zhu | H04L 12/4641 |
| 2019/0140947 | A1* | 5/2019 | Zhuang | H04L 45/306 |
| 2020/0285591 | A1* | 9/2020 | Luo | G06F 16/144 |
| 2020/0356282 | A1* | 11/2020 | Wu | G06F 3/0613 |
| 2021/0056074 | A1* | 2/2021 | Zhu | G06F 3/06 |
| 2022/0100384 | A1* | 3/2022 | Yang | G06F 11/1458 |
| 2022/0342775 | A1* | 10/2022 | Takubo | G06F 11/1417 |
| 2022/0382685 | A1* | 12/2022 | Luo | G06F 3/0688 |
| 2023/0004304 | A1* | 1/2023 | Zha | G06F 3/0673 |
| 2023/0015979 | A1* | 1/2023 | Luo | G06F 3/0659 |
| 2025/0165150 | A1* | 5/2025 | Zhang | G06F 3/061 |
| 2025/0291505 | A1* | 9/2025 | Luo | G06F 11/0727 |

FOREIGN PATENT DOCUMENTS

| | | | | | |
|---|---|---|---|---|---|
| CN | 104301146 | A | | 1/2015 | |
| CN | 105516263 | A | * | 4/2016 | G06F 16/137 |
| CN | 105610716 | A | | 5/2016 | |
| CN | 106936731 | A | | 7/2017 | |
| CN | 107491270 | B | * | 6/2020 | G06F 3/061 |
| CN | 109582213 | B | * | 10/2020 | G06F 3/06 |
| CN | 112130758 | A | * | 12/2020 | G06F 3/061 |
| CN | 109995813 | B | * | 2/2021 | H04L 67/563 |
| CN | 112527492 | A | * | 3/2021 | G06F 3/0604 |
| CN | 113377280 | A | * | 9/2021 | G06F 3/0613 |
| CN | 113391769 | A | * | 9/2021 | G06F 3/0611 |
| CN | 115248720 | A | * | 10/2022 | G06F 9/45558 |
| CN | 116048413 | B | * | 6/2023 | G06F 3/06 |
| CN | 116774905 | A | * | 9/2023 | G06F 3/0679 |
| CN | 116954523 | B | * | 1/2024 | G06F 3/06 |
| CN | 118860297 | B | * | 12/2024 | G06F 3/067 |
| CN | 117311605 | B | * | 5/2025 | G06F 3/067 |
| CN | 120050289 | A | * | 5/2025 | H04L 67/1097 |
| CN | 120295578 | A | * | 7/2025 | G06F 16/27 |
| CN | 120596533 | A | * | 9/2025 | |
| EP | 3196776 | A1 | | 7/2017 | |
| EP | 3531266 | A1 | * | 8/2019 | G06F 3/0688 |
| EP | 3531666 | A1 | * | 8/2019 | H04L 67/1097 |
| EP | 3739440 | A1 | * | 11/2020 | G06F 3/0659 |
| EP | 3531666 | B1 | * | 9/2021 | H04L 67/1097 |
| EP | 4030296 | A1 | * | 7/2022 | G06F 3/0635 |
| EP | 4102788 | A1 | * | 12/2022 | G06F 3/0613 |
| EP | 4116815 | A1 | * | 1/2023 | G06F 3/0683 |
| EP | 3985949 | B1 | * | 7/2024 | G06F 12/10 |
| WO | 2016023370 | A1 | | 2/2016 | |
| WO | WO-2019062856 | A1 | * | 4/2019 | H04L 67/1097 |
| WO | WO-2019127021 | A1 | * | 7/2019 | H04L 67/1097 |
| WO | WO-2019170004 | A1 | * | 9/2019 | G06F 3/067 |
| WO | WO-2021179556 | A1 | * | 9/2021 | G06F 3/0613 |
| WO | WO-2021190232 | A1 | * | 9/2021 | G06F 3/0683 |
| WO | WO-2024164614 | A1 | * | 8/2024 | G06F 3/06 |

* cited by examiner

100

100

STORAGE SYSTEM, REQUEST PROCESSING METHOD, AND SWITCH

CROSS-REFERENCE TO RELATED APPLICATIONS

This application is a continuation of International Patent Application No. PCT/CN2020/114222 filed on Sep. 9, 2020, which claims priority to Chinese Patent Application No. 202010159006.9 filed on Mar. 9, 2020 and Chinese Patent Application No. 202010568783.9 filed on Jun. 19, 2020. The disclosures of the aforementioned applications are hereby incorporated by reference in their entireties.

TECHNICAL FIELD

The present disclosure relates to the field of computer technologies, and in particular, to a storage system, a request processing method, and a switch.

BACKGROUND

The Internet and digitalization promote generation of data explosion. Therefore, an extremely large information processing requirement is caused. For example, a data storage requirement far exceeds a storage capacity that can be provided by a current enterprise array storage system. A distributed system used for information processing may be a storage system, and the storage system starts to be a main storage form in an internet environment and a big data environment, for example, may be a Hadoop distributed file system (HDFS).

The distributed system may allocate information processing and load to each server node, so that a capacity and performance of information processing are improved. However, a large quantity of messages and data packets are distributed and transferred on a network connected between nodes. This also increases a quantity of inter-node messages and an information forwarding amount in the distributed system, and also increases a delay of the distributed system.

For example, the storage system may allocate a storage capacity and load to each storage server node, so that storage energy and performance are improved. However, a large quantity of messages and data packets are distributed and transferred on a network connected between nodes. This also increases a quantity of inter-node messages and a data forwarding amount in a distributed storage system, and also increases a delay of the storage system.

SUMMARY

Embodiments of the present disclosure provide a storage system, a request processing method, and a switch, to reduce a delay of the storage system and improve information processing efficiency.

To resolve the foregoing technical problem, embodiments of the present disclosure provide the following technical solutions:

According to a first aspect, an embodiment of the present disclosure provides a storage system. The storage system includes a switch and a plurality of storage nodes, and there are communication connections between the switch and a client and between the switch and the plurality of storage nodes. The switch is configured to receive a first request from the client, where the first request includes an identifier of a storage partition; query an entry in a forwarding table based on the identifier of the storage partition, to determine a target storage node corresponding to the identifier of the storage partition; and send the first request to the target storage node, where the entry includes a mapping relationship between the identifier of the storage partition and the target storage node, and the target storage node is a storage node in the plurality of storage nodes. The target storage node is configured to receive the first request from the switch. In this embodiment of the present disclosure, the switch receives the first request from the client, and queries the entry in the forwarding table based on the first request, to determine the target storage node corresponding to the identifier of the storage partition. In other words, the switch may determine, by using the entry in the forwarding table, the target storage node that is to process the first request, so that overheads of messages between the client and the plurality of storage nodes and a data forwarding amount are reduced. In a manner of querying the entry, a delay of the storage system is reduced, information processing efficiency is improved, and performance of the storage system is improved.

In a possible implementation, the target storage node is further configured to generate a request processing result based on the first request, and send the request processing result to the switch; and the switch is further configured to receive the request processing result, and send the request processing result to the client. In this embodiment of the present disclosure, a forwarding table is built in a software-defined switch, and the software-defined switch can implement port-based switching during routing. Therefore, an access delay of the client can be reduced. For example, a delay during input/output access between the client and a storage server cluster is significantly reduced.

In a possible implementation, the storage system further includes a controller, and there is a communication connection between the controller and each of the client, the switch, and the plurality of storage nodes. The controller is configured to receive a second request from the client, determine the target storage node from the plurality of storage nodes based on the second request, and send the second request to the target storage node. The target storage node is configured to receive the second request from the controller, generate the identifier of the storage partition based on the second request, and send the identifier of the storage partition to the controller. The controller is configured to receive the identifier of the storage partition from the target storage node, and send the entry that includes the mapping relationship between the identifier of the storage partition and the target storage node to the switch. The switch is configured to receive the entry from the controller, and update the forwarding table based on the entry. In this embodiment of the present disclosure, the controller may send the entry to the switch, so that the switch can directly exchange a request with the data server in the server cluster by using the forwarding table. Therefore, an access delay of the client and a processing delay of a request are reduced.

In a possible implementation, the controller is configured to after receiving the identifier of the storage partition from the target storage node, update a partition mapping table in the controller based on the mapping relationship between the identifier of the storage partition and the target storage node. For example, in the storage system, the controller has a function of a name server, and therefore, the partition mapping table may include a mapping relationship between a virtual name server and a storage node. The controller updates the partition mapping table in the controller by using the mapping relationship between the identifier of the storage partition and the target storage node, so that a mapping relationship between the storage partition and the target storage node can be recorded.

In a possible implementation, the controller is configured to after receiving the identifier of the storage partition from the target storage node, update a storage node status table in the controller based on the mapping relationship between the identifier of the storage partition and the target storage node. The controller may record a real-time status of the storage node in the storage node status table, so that the controller accurately obtains a status of each of the plurality of storage nodes.

According to a second aspect, an embodiment of the present disclosure further provides a request processing method. The request processing method is applied to a storage system, the storage system includes a switch and a plurality of storage nodes, there are communication connections between the switch and a client and between the switch and the plurality of storage nodes, and the method includes the switch receives a first request from the client, where the first request includes an identifier of a storage partition; the switch queries an entry in a forwarding table based on the identifier of the storage partition to determine a target storage node corresponding to the identifier of the storage partition, where the entry includes a mapping relationship between the identifier of the storage partition and the target storage node, and the target storage node is a storage node in the plurality of storage nodes; the switch sends the first request to the target storage node; and the target storage node receives the first request from the switch. In this embodiment of the present disclosure, the switch receives the first request from the client, and queries the entry in the forwarding table based on the first request, to determine the target storage node corresponding to the identifier of the storage partition. In other words, the switch may determine, by using the entry in the forwarding table, the target storage node that is to process the first request, so that overheads of messages between the client and the plurality of storage nodes and a data forwarding amount are reduced. In a manner of querying the entry, a delay of the storage system is reduced, information processing efficiency is improved, and performance of the storage system is improved.

In a possible implementation, the method further includes the target storage node generates a request processing result based on the first request; the target storage node sends the request processing result to the switch; and the switch receives the request processing result, and sends the request processing result to the client. In this embodiment of the present disclosure, a forwarding table is built in a software-defined switch, and the software-defined switch can implement port-based switching during routing. Therefore, an access delay of the client can be reduced. For example, a delay during input/output access between the client and a storage server cluster is significantly reduced.

In a possible implementation, the storage system further includes a controller, there is a communication connection between the controller and each of the client, the switch, and the plurality of storage nodes, and the method further includes the controller receives a second request from the client; the controller determines the target storage node from the plurality of storage nodes based on the second request; the controller sends the second request to the target storage node; the target storage node receives the second request from the controller; the target storage node generates the identifier of the storage partition based on the second request; the target storage node sends the identifier of the storage partition to the controller; the controller receives the identifier of the storage partition from the target storage node; the controller sends the entry that includes the mapping relationship between the identifier of the storage partition and the target storage node to the switch; and the switch receives the entry from the controller, and updates the forwarding table based on the entry. In this embodiment of the present disclosure, the controller may send the entry to the switch, so that the switch can directly exchange a request with the data server in the server cluster by using the forwarding table. Therefore, an access delay of the client and a request processing delay are reduced.

In a possible implementation, the method further includes, after receiving the identifier of the storage partition from the target storage node, the controller updates a partition mapping table in the controller based on the mapping relationship between the identifier of the storage partition and the target storage node. For example, in the storage system, the controller has a function of a name server, and therefore, the partition mapping table may include a mapping relationship between a virtual name server and a storage node. The controller updates the partition mapping table in the controller by using the mapping relationship between the identifier of the storage partition and the target storage node, so that a mapping relationship between the storage partition and the target storage node can be recorded.

In a possible implementation, the method further includes, after receiving the identifier of the storage partition from the target storage node, the controller updates a storage node status table in the controller based on the mapping relationship between the identifier of the storage partition and the target storage node. The controller may record a real-time status of the storage node in the storage node status table, so that the controller accurately obtains a status of each of the plurality of storage nodes.

In the second aspect of the present disclosure, the steps in the request processing method may be steps performed by a function module described in the foregoing first aspect and each possible implementation. For details, refer to the descriptions in the first aspect and each possible implementation.

According to a third aspect, an embodiment of the present disclosure further provides a switch. The switch is applied to a storage system, the storage system further includes a plurality of storage nodes, there are communication connections between the switch and a client and between the switch and the plurality of storage nodes, and the switch includes a receiving module configured to configured to receive a first request from the client, where the first request includes an identifier of a storage partition; a processing module configured to query an entry in a forwarding table based on the identifier of the storage partition, to determine a target storage node corresponding to the identifier of the storage partition, where the entry includes a mapping relationship between the identifier of the storage partition and the target storage node, and the target storage node is a storage node in the plurality of storage nodes; and a sending module configured to send the first request to the target storage node.

In a possible implementation, the receiving module is further configured to receive a request processing result from the target storage node based on the first request; and the sending module is further configured to send the request processing result to the client.

In a possible implementation, the storage system further includes a controller, and there is a communication connection between the controller and each of the client, the switch, and the plurality of storage nodes. The receiving module is configured to receive the entry from the controller and that includes the mapping relationship between the identifier of the storage partition and the target storage node, where the identifier of the storage partition is generated by the target storage node, and the target storage node is determined by the controller from the plurality of storage nodes. The processing module is configured to update the forwarding table based on the entry.

According to a fourth aspect, an embodiment of the present disclosure further provides a request processing method. The request processing method is applied to a switch in a storage system, the storage system further includes a plurality of storage nodes, there are communication connections between the switch and a client and between the switch and the plurality of storage nodes, and the method includes the switch receives a first request from the client, where the first request includes an identifier of a storage partition; the switch queries an entry in a forwarding table based on the identifier of the storage partition, to determine a target storage node corresponding to the identifier of the storage partition, where the entry includes a mapping relationship between the identifier of the storage partition and the target storage node, and the target storage node is a storage node in the plurality of storage nodes; and the switch sends the first request to the target storage node.

In a possible implementation, the method further includes the switch receives a request processing result from the target storage node based on the first request; and the switch sends the request processing result to the client.

In a possible implementation, the storage system further includes a controller, there is a communication connection between the controller and each of the client, the switch, and the plurality of storage nodes, and the method further includes the switch receives the entry from the controller and that include the mapping relationship between the identifier of the storage partition and the target storage node, where the identifier of the storage partition is generated by the target storage node, and the target storage node is determined by the controller from the plurality of storage nodes; and the switch updates the forwarding table based on the entry.

In the fourth aspect of the present disclosure, the steps in the request processing method may be steps performed by a function module described in the foregoing third aspect and each possible implementation. For details, refer to the descriptions in the third aspect and each possible implementation.

According to a fifth aspect, an embodiment of the present disclosure further provides a controller. The controller belongs to a storage system, the storage system further includes a switch and a plurality of storage nodes, there is a communication connection between the controller and each of a client, the switch, and the plurality of storage nodes, and the controller includes a receiving module configured to receive a second request from the client; a processing module configured to determine a target storage node from the plurality of storage nodes based on the second request; and a sending module configured to send the second request to the target storage node. The receiving module is further configured to receive an identifier of a storage partition from the target storage node based on the second request. The sending module is further configured to send an entry that includes a mapping relationship between the identifier of the storage partition and the target storage node to the switch.

In a possible implementation, the processing module is further configured to after receiving the identifier of the storage partition from the target storage node, update a partition mapping table in the controller based on the mapping relationship between the identifier of the storage partition and the target storage node.

In a possible implementation, the processing module is further configured to after receiving the identifier of the storage partition from the target storage node, update a storage node status table in the controller based on the mapping relationship between the identifier of the storage partition and the target storage node.

According to a sixth aspect, an embodiment of the present disclosure further provides a request processing method. The request processing method is applied to a controller in a storage system, the storage system further includes a switch and a plurality of storage nodes, there is a communication connection between the controller and each of a client, the switch, and the plurality of storage nodes, and the method includes the controller receives a second request from the client; the controller determines a target storage node from the plurality of storage nodes based on the second request; the controller sends the second request to the target storage node; the controller receives an identifier of a storage partition from the target storage node based on the second request; and the controller sends an entry that includes a mapping relationship between the identifier of the storage partition and the target storage node to the switch.

In a possible implementation, the method further includes, after receiving the identifier of the storage partition from the target storage node, the controller updates a partition mapping table in the controller based on the mapping relationship between the identifier of the storage partition and the target storage node.

In a possible implementation, the method further includes, after receiving the identifier of the storage partition from the target storage node, the controller updates a storage node status table in the controller based on the mapping relationship between the identifier of the storage partition and the target storage node.

According to a seventh aspect, an embodiment of the present disclosure provides a computer-readable storage medium. The computer-readable storage medium stores instructions, and when the instructions are run on a computer, the computer is enabled to perform the method in the second aspect, the fourth aspect, or the sixth aspect.

According to an eighth aspect, an embodiment of the present disclosure provides a computer program product including instructions, and when the computer program product is run on a computer, the computer is enabled to perform the method in the second aspect, the fourth aspect, or the sixth aspect.

According to a ninth aspect, an embodiment of the present disclosure provides a communication apparatus. The communication apparatus may include an entity such as a terminal device or a chip, and the communication apparatus includes a processor and a memory. The memory is configured to store a forwarding table. The processor is configured to execute instructions in the memory, so that the communication apparatus is enabled to perform the method according to any implementation of the first aspect or the second aspect.

According to a tenth aspect, the present disclosure provides a chip system. The chip system includes a processor configured to support a switch or a controller in implementing functions involved in the foregoing aspects, for example, sending or processing data and/or information involved in the foregoing methods. In a possible design, the chip system further includes a memory, and the memory is configured to store program instructions and data for the switch or the controller. The chip system may include a chip, or may include a chip and another discrete component.

DESCRIPTION OF EMBODIMENTS

Figure 1A:
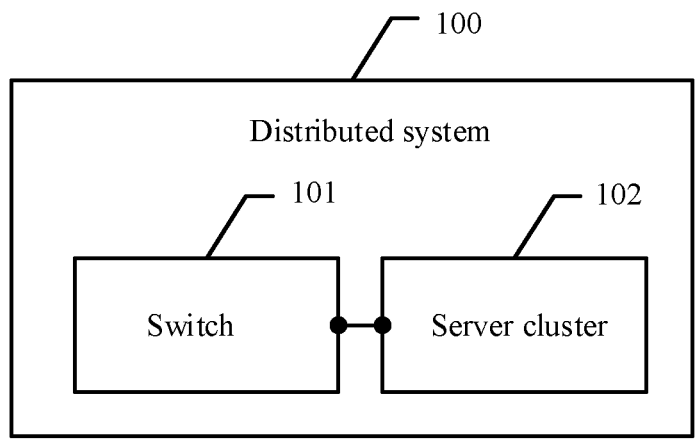
FIG. 1A is a schematic diagram of a component architecture of a distributed system according to an embodiment of the present disclosure.

Embodiments of the present disclosure provide a storage system, a request processing method, and a switch, to reduce a delay of the storage system and improve information processing efficiency.

The following describes embodiments of the present disclosure with reference to accompanying drawings.

In the specification, claims, and the accompanying drawings of the present disclosure, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of the present disclosure. In addition, the terms "include", "have" and any other variants thereof mean to cover a non-exclusive inclusion, so that a process, method, system, product, or device that includes a series of units is not necessarily limited to those units, but may include other units not expressly listed or inherent to such a process, method, product, or device.

Technical solutions in embodiments of the present disclosure may be applied to various distributed systems. For example, the distributed system may be a distributed data processing system or a storage system. An application scenario of the distributed system provided in embodiments of the present disclosure is not limited. For example, the storage system usually includes the following two types of components: a name server and a plurality of data servers. The plurality of data servers is also referred to as a server cluster. Generally, the storage system cannot identify and directly distribute data between components in application layer address space. Therefore, the name server needs to be used for parsing. The distributed system provided in embodiments of the present disclosure includes a switch and a server cluster. Specifically, the switch provided in embodiments of the present disclosure may be a software-defined switch. The software-defined switch is used as an example for description subsequently, and the server cluster may be specifically a plurality of storage nodes. In the storage system provided in embodiments of the present disclosure, a definable feature of an entry in a software-defined networking (SDN) forwarding table is used to directly exchange a read/write request for stored data, so that a plurality of times of interaction between a client and both the name server and the data server can be effectively reduced.

In addition to the storage system, the distributed system provided in embodiments of the present disclosure may alternatively be a network load balancing system. Generally, the network load balancing system mainly implements load balancing at a software level by using a server cluster, and this significantly increases server costs. The distributed system provided in embodiments of the present disclosure includes a software-defined switch and a server cluster. The software-defined switch can identify an upper-layer data packet by using an entry in a forwarding table and directly distribute the data packet, so that performance of the distributed system is improved.

As shown in FIG. 1A, an embodiment of the present disclosure provides a distributed system 100. The distributed system 100 includes a switch 101 and a server cluster 102. There is a communication connection between a client and the switch 101, and there is a communication connection between the switch 101 and the server cluster 102.

The switch 101 is configured to receive a first request from the client, where the first request includes a server partition number; query an entry in a forwarding table in the switch 101 based on a to-be-processed server partition number, to determine a data server corresponding to the server partition number, where the entry in the forwarding table includes a mapping relationship between the server partition number and a data server in the server cluster 102; determine, from the server cluster 102 based on an entry query result, a first data server corresponding to the server partition number; and send the first request to the first data server.

In addition, the first request may further carry a source address and a destination address, and the address may be an Internet Protocol (IP) address.

The first data server is configured to receive the first request from the switch 101.

In some embodiments of the present disclosure, the first data server is further configured to generate a request processing result based on the first request, and send the request processing result to the switch 101.

The switch 101 is configured to receive the request processing result, and send the request processing result to the client.

There is a communication connection between the client and a software-defined switch. After the software-defined switch sends the request processing result to the client, the client may receive the request processing result by using the communication connection. In this embodiment of the present disclosure, a forwarding table is built in the software-defined switch, and the software-defined switch can implement port-based switching during routing. Therefore, an access delay of the client can be reduced. For example, a delay during input/output (I/O) access between the client and a storage server cluster is significantly reduced.

When the distributed system provided in this embodiment of the present disclosure is a storage system, the server partition number is an identifier of a storage partition, and the data server is a storage node or a storage server. In another implementation, the storage node may alternatively be a hard disk frame.

In this embodiment of the present disclosure, the client may be specifically deployed in a host, and the first request from the client has a plurality of implementations. For example, the first request may be a data read request, a data write request, or an information processing request, and this is not limited herein. The to-be-processed server partition number included in the first request may be a partition identifier of a to-be-processed server, and the to-be-processed server is one or more data servers in the server cluster.

The switch 101 has a network function and further has a function of directly exchanging a request of the client. The switch 101 may implement a routing function by using the entry in the forwarding table. The forwarding table may also be referred to as a forwarding table. For example, the switch 101 stores the forwarding table, and the forwarding table includes a mapping relationship between a server partition number and a data server in the server cluster. After receiving the request of the client, the switch 101 may send the request of the client to a corresponding data server based on the local forwarding table of the switch 101, so that a plurality of times of interaction between the client and both the switch and the data server can be effectively reduced. For example, the switch 101 may be a switch implemented in an SDN manner. A software-defined network is a new network architecture. A control plane of the switch is separated from a data plane by using an OpenFlow protocol, and is implemented in a software manner instead. In this architecture, a network administrator can replan a network by using a program in a central control manner without changing a hardware device, to control network traffic and facilitate core network configuration.

For example, the distributed system 100 provided in this embodiment of the present disclosure may be a storage system. The storage system may be specifically a software defined storage (SDS) system. The switch 101 in the storage system may alternatively be implemented through SDS. The storage system may include a plurality of storage nodes. For example, the plurality of storage nodes may be further implemented by using the server cluster. Therefore, the switch 101 provided in this embodiment of the present disclosure may also be referred to as an SDN switch or an SDN/SDS switch. Compared with a current storage system delivered in a hardware manner, data storage management software in the SDS storage system is independent of lower-layer hardware. Therefore, the SDS storage system can implement more flexible policy-based storage management, configuration, and supply. The SDS storage system includes a storage virtualization layer to isolate upper-layer storage management software from the lower-layer hardware. The storage management software may implement data management functions such as data deduplication, replication, snapshot, automatic thin provisioning, and backup above the virtualization layer.

Example descriptions are as follows. In the storage system, the switch 101 stores a forwarding table, and a mapping relationship between a server partition number and a data server in the server cluster 102 is recorded in an entry in the forwarding table. Compared with a current switch, the switch 101 provided in this embodiment of the present disclosure has a network function of the current switch, and also has a function of directly forwarding a read/write request for stored data. In other words, the switch 101 stores the forwarding table. After receiving the request from the client, the switch 101 forwards a data read/write request of the client to a corresponding data server based on the entry in the forwarding table of the switch 101. In the storage system provided in this embodiment of the present disclosure, the read/write request for stored data is directly exchanged by using the switch 101, so that a plurality of times of interaction between the client and both an original name server and an original data server can be effectively reduced.

The server cluster 102 includes N data servers. A value of N is a positive integer, and the value of N is not limited. The first data server is one or more data servers in the server cluster 102. The first data server is a data server determined by the switch 101 from the server cluster 102 based on a route query result. For example, the first data server may be a target storage node determined by the switch after querying an entry based on the identifier of the storage partition. The server cluster 102 provided in this embodiment of the present disclosure may be a storage server cluster, a data server cluster, or an information processing server cluster, and this is not limited herein.

Specifically, the first data server processes the first request in a plurality of implementations. For example, if the first request may be a data read request, the first data server may read data from a storage resource of the first data server based on the data read request. For another example, if the first request may be a data write request, the first data server may write data to the storage resource of the first data server based on the data write request. For another example, if the first request may be an information processing request, the first data server may perform information processing based on the information processing request.

In some embodiments of the present disclosure, in addition to the foregoing steps, the request processing method provided in this embodiment of the present disclosure further includes:

After receiving the server partition number, a software-defined controller updates a partition mapping table in the software-defined controller based on a mapping relationship between the server partition number and the first data server.

The software-defined controller includes the partition mapping table, and the partition mapping table may also be referred to as a storage partition mapping table or a partition mapping view. The software-defined controller updates the partition mapping table in the software-defined controller based on the mapping relationship between the server partition number and the first data server. In other words, the software-defined controller may record the mapping relationship between the server partition number and the first data server in the partition mapping table. For example, in the storage system, the software-defined controller has a function of a name server, and therefore, the partition mapping table may include a mapping relationship between a virtual name server and a data server.

In some embodiments of the present disclosure, in addition to the foregoing steps, the request processing method provided in this embodiment of the present disclosure further includes:

After receiving the server partition number, a software-defined controller updates a server status table in the software-defined controller based on a new mapping relationship between the server partition number and the first data server.

The software-defined controller includes the server status table, and a server status may also be referred to as a storage node status. For example, there are a plurality of data server statuses, for example, the status includes active, lost, and caching up. The software-defined controller may record a real-time status of the server in the server status table, so that the software-defined controller accurately obtains a status of each server in the server cluster.

Figure 1B:
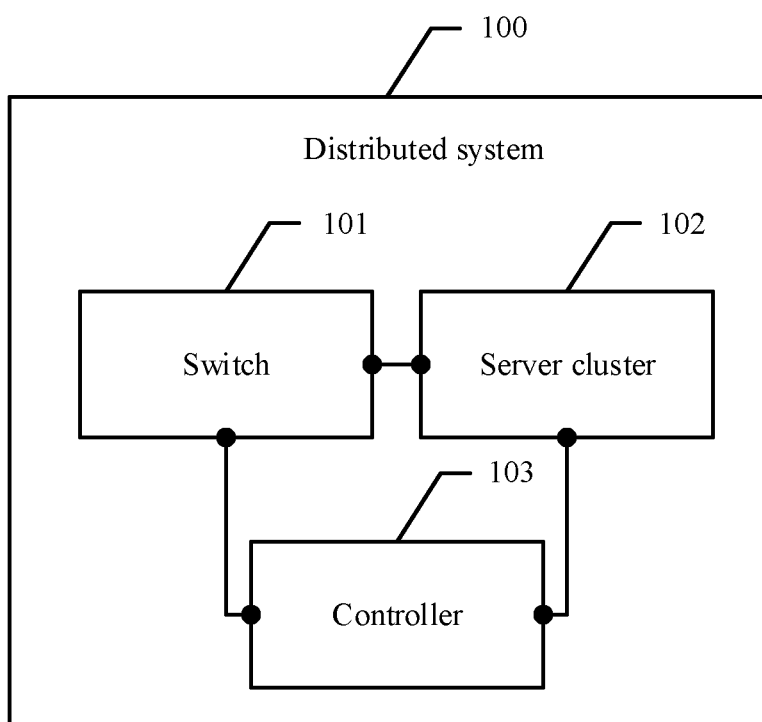
FIG. 1B is a schematic diagram of a component architecture of another distributed system according to an embodiment of the present disclosure.

As shown in FIG. 1B, an embodiment of the present disclosure provides a distributed system 100. In addition to a switch 101 and a server cluster 102, the distributed system 100 further includes a controller 103. There is a communication connection between a client and the controller 103, and there is a communication connection between the controller 103 and each of the switch 101 and the server cluster 102.

The controller 103 is configured to receive a second request from the client, determine a first data server from the server cluster 102 based on the second request, and send the second request to the first data server.

The first data server is configured to receive the second request from the controller 103, generate a server partition number based on the second request, and send the server partition number to the controller 103.

The controller 103 is configured to receive the server partition number from the first data server, and send a mapping relationship between the server partition number and the first data server to the switch 101.

The switch 101 is configured to receive the mapping relationship from the controller 103, and update a forwarding table based on the mapping relationship.

In addition to a function of a name server in a storage system, the controller 103 further has a function of a controller implemented in a software-defined networking manner. The controller 103 may maintain a forwarding table between the controller 103 and the server cluster.

Example descriptions are as follows: In the storage system, the controller 103 has the function of the name server in the storage system. Therefore, the controller 103 may communicate with a data server and generate a mapping relationship between the server partition number and the data server as an entry in the forwarding table. Therefore, the entry in the forwarding table may also be referred to as a mapping relationship entry, and the entry is delivered to the switch 101.

For example, the distributed system 100 provided in this embodiment of the present disclosure may be a storage system. The storage system may be specifically an SDS storage system. The controller 103 in the storage system may be implemented through SDS. Therefore, the controller 103 provided in this embodiment of the present disclosure may also be referred to as an SDN controller or an SDN/SDS controller. In the storage system provided in this embodiment of the present disclosure, the controller 103 may send an entry that includes the mapping relationship between the server partition number and the data server to the switch 101, so that the switch 101 may directly send a read/write request for stored data by using the entry, to effectively reduce a plurality of times of interaction between the client and both an original name server and an original data server.

In some embodiments of the present disclosure, that a software-defined controller sends a mapping relationship between the server partition number and the first data server to a software-defined switch includes the software-defined controller sends an entry in the forwarding table to the software-defined switch, where the entry includes the mapping relationship between the server partition number and the first data server; and the software-defined switch receives the entry from the software-defined controller, and updates the forwarding table based on the entry, where update to the forwarding table in the software-defined switch may be update to the entry in the forwarding table.

In some embodiments of the present disclosure, the first request is a data write request. A destination address carried in the data write request is an address of the distributed system, for example, the address of the distributed system may be a unified IP address of the storage system. The request processing method provided in this embodiment of the present disclosure further includes the following steps.

A1. The first data server allocates, based on the data write request, a storage resource from a server partition corresponding to the server partition number, and sends an address of the first data server to the software-defined switch.

The first data server is one or more servers in the server cluster, and the first data server is a data server determined by the software-defined switch from the server cluster based on a route query result. For example, the first data server may be a storage server, or may be referred to as a storage server. The first data server obtains, based on the data write request, a server partition corresponding to a to-be-processed server partition number. The first data server allocates a storage resource to the server partition, and then sends the address of the first data server to the software-defined switch. The address of the first data server is an address of to-be-written data.

A2. The software-defined switch receives the address of the first data server, and sends a response message to the client, where the response message includes the address of the first data server, and a source address of the response message is the address of the distributed system.

The software-defined switch sends the response message to the client, and the response message includes the address of the first data server, so that the client may obtain the address of the first data server after receiving the response message; in other words, the client may determine an address to which data needs to be written. The source address of the response message is the address of the distributed system, for example, the source address of the response message is the unified IP address of the storage system.

A3. The client receives the response message from the software-defined switch, and sends a data write command to the software-defined switch, where the data write command includes the to-be-written data, and a destination address carried in the data write command is the address of the distributed system.

In this embodiment of the present disclosure, after receiving the response message, the client determines, based on the response message, the address to which data needs to be written (to be specific, the to-be-written data needs to be written to the first data server). The client sends the data write command to the software-defined switch. The data write command includes the to-be-written data, and a destination address carried in the data write command is the address of the distributed system, for example, the destination address carried in the data write command is the unified IP address of the storage system.

A4. The software-defined switch receives the data write command, and sends the data write command to the first data server based on the forwarding table.

In this embodiment of the present disclosure, the forwarding table is stored in the software-defined switch. The forwarding table may be used to send the data write command to a corresponding data server in the server cluster. The software-defined switch may send the data write command to the first data server by using the forwarding table. Compared with a current manner used by a name server to search for a data server, an access delay of the client can be reduced in this embodiment of the present disclosure.

A5. The first data server receives the data write command from the software-defined switch, writes the to-be-written data to the storage resource, and send a data write result to the software-defined switch.

In this embodiment of the present disclosure, the first data server receives the data write command from the software-defined switch. The first data server extracts the to-be-written data from the data write command, writes the data based on a pre-allocated storage resource, generates the data write result after the data is written, and then sends the data write result to the software-defined switch. The data write result is used to indicate whether the data is successfully written, and indicate a location of the storage resource to which the data is written.

A6. The software-defined switch receives the data write result, and sends the data write result to the client, where a source address of the data write result is the address of the distributed system.

In this embodiment of the present disclosure, the software-defined switch may receive the data write result from the first data server. The software-defined switch may communicate with the client, and send the data write result to the client. The source address of the data write result is the address of the distributed system, for example, the source address of the data write result is the unified IP address of the storage system.

A7. The client receives the data write result from the software-defined switch.

In this embodiment of the present disclosure, the client may receive the data write result by using a communication connection between the client and the software-defined switch, and the data write result is used to indicate whether the data is successfully written and indicate the location of the storage resource to which the data is written. The client may determine, based on the received data write result, whether the to-be-written data is successfully written, and determine, based on the data write result, the location of the storage resource that is in the first data server and to which the to-be-written data is written.

In some embodiments of the present disclosure, the first request is a data read request, and a destination address carried in the data read request is the address of the distributed system. In addition to the foregoing steps, the request processing method provided in this embodiment of the present disclosure further includes the following steps.

B1. The first data server determines, based on the data read request, a server partition corresponding to a to-be-processed server partition number, reads data from the server partition, and sends the read data to the software-defined switch.

The client may generate the data read request, and the client sends the data read request to the software-defined switch. The data read request includes the to-be-processed server partition number. A destination address carried in the data read request is the address of the distributed system. For example, the destination address carried in the data read request is the unified IP address of the storage system. The software-defined switch sends the data read request to the first data server based on the forwarding table in the software-defined switch. The first data server determines, based on the data read request, the server partition corresponding to the server partition number. The storage server partition stores data that needs to be read, and then the first data server reads the data from the server partition. After obtaining the read data, the first data server may send the read data to the software-defined switch.

B2. The software-defined switch receives the read data, and sends a data read result to the client, where the data read result includes the read data, and a source address of the data read result is the address of the distributed system.

In this embodiment of the present disclosure, the software-defined switch may receive the read data from the first data server, and the software-defined switch sends the data read result to the client by using a communication connection between the software-defined switch and the client. A source address of the data read result is the address of the distributed system, for example, the source address of the data read result is the unified IP address of the storage system.

B3. The client receives the data read result from the software-defined switch.

In this embodiment of the present disclosure, the client may receive the data read result by using the communication connection between the client and the software-defined switch, and the data read result carries the read data. The client may determine the read data based on the received data read result, to read data of the client.

In this embodiment of the present disclosure, the client sends the second request to the controller 103, and the second request may be used to trigger creation of the server partition. The controller 103 determines the first data server from the server cluster 102 based on the second request. The first data server is one or more servers in the server cluster 102. The first data server is a data server determined by the controller 103 from the server cluster 102 based on the second request. For example, the first data server may be a target storage node determined by the controller from a plurality of storage nodes based on the second request. The first data server may generate the server partition number based on the second request. The first data server sends the server partition number to the controller 103. The controller 103 may determine the mapping relationship between the server partition number and the first data server. The controller 103 may further send an entry that includes the mapping relationship to the switch 101. The switch 101 receives the entry from the controller 103, and updates the forwarding table based on the entry. The entry may be recorded in the forwarding table. In this embodiment of the present disclosure, the controller 103 may send the entry to the switch 101, so that the switch 101 can directly exchange a request with the data server in the server cluster 102 by using the forwarding table. Therefore, an access delay of the client and a request processing delay are reduced.

Figure 2A:
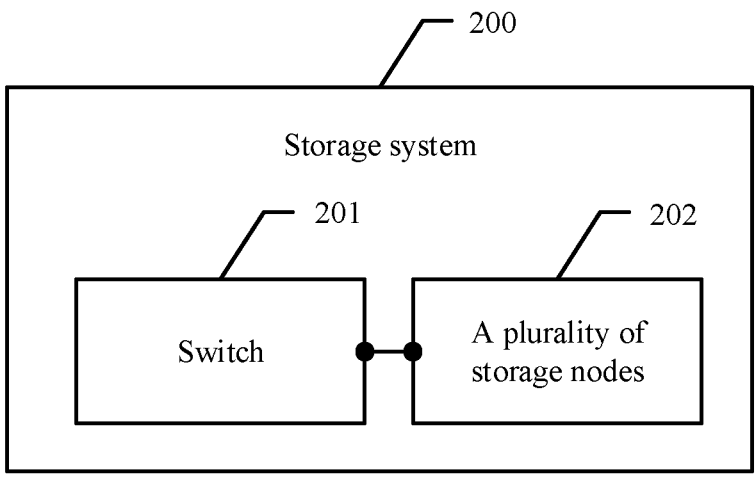
FIG. 2A is a schematic diagram of a component architecture of a storage system according to an embodiment of the present disclosure.

As shown in FIG. 2A, a storage system 200 is used as an example of the distributed system below for description. In the storage system, a data server is a storage node, a server partition is a storage partition, and a server partition number is an identifier of the storage partition. The storage system 200 includes a switch 201 and a plurality of storage nodes 202, and there are communication connections between the switch 201 and a client and between the switch 201 and the plurality of storage nodes 202.

The switch 201 is configured to receive a first request from the client, where the first request includes an identifier of a storage partition; query an entry in a forwarding table based on the identifier of the storage partition, to determine a target storage node corresponding to the identifier of the storage partition; and send the first request to the target storage node, where the entry includes a mapping relationship between the identifier of the storage partition and the target storage node, and the target storage node is a storage node in the plurality of storage nodes 202.

The target storage node is configured to receive the first request from the switch 201.

In this embodiment of the present disclosure, the client may be specifically deployed in a host, and the first request from the client has a plurality of implementations. For example, the first request may be a data read request, a data write request, or an information processing request, and this is not limited herein. A partition number of the storage node that is included in the first request may be a partition identifier of the target storage node that can process the first request, and the target storage node is one or more storage nodes in the plurality of storage nodes.

The switch has a network function, and also has a function of directly exchanging a request of the client. The switch can implement a forwarding function by using an entry in the forwarding table. After receiving the request of the client, the switch may send the request of the client to a corresponding storage node based on the local forwarding table of the switch, so that a plurality of times of interaction between the client and both the switch and the storage node can be effectively reduced.

In some embodiments of the present disclosure, the target storage node is further configured to generate a request processing result based on the first request, and send the request processing result to the switch 201.

The switch 201 is further configured to receive the request processing result, and send the request processing result to the client.

The switch further has a function of sending the request processing result to the client, so that the client may obtain the request processing result that is fed back for the first request. For example, the client determines, based on the request processing result, whether required data is read or whether to-be-written data is successfully written.

Figure 2B:
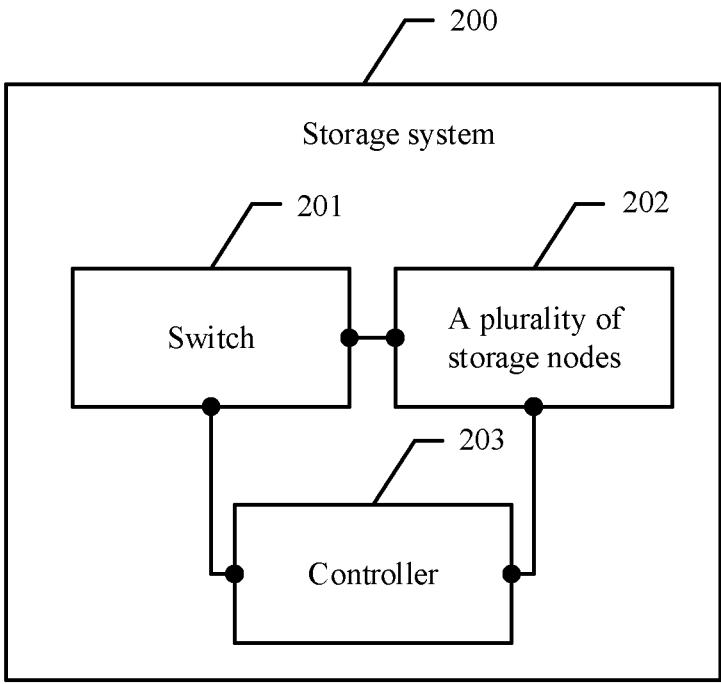
FIG. 2B is a schematic diagram of a component architecture of another storage system according to an embodiment of the present disclosure.

In some embodiments of the present disclosure, as shown in FIG. 2B, the storage system 200 further includes a controller 203. There is a communication connection between the controller 203 and each of the client, the switch 201, and the plurality of storage nodes 202.

The controller 203 is configured to receive a second request from the client, determine the target storage node from the plurality of storage nodes 202 based on the second request, and send the second request to the target storage node.

The target storage node is configured to receive the second request from the controller 203, generate the identifier of the storage partition based on the second request, and send the identifier of the storage partition to the controller 203.

The controller 203 is configured to receive the identifier of the storage partition from the target storage node, and send the entry that includes the mapping relationship between the identifier of the storage partition and the target storage node to the switch 201.

The switch 201 is configured to receive the entry from the controller 203, and update the forwarding table based on the entry.

The client sends the second request to the controller 203, and the second request may be used to trigger creation of the storage partition. The controller selects, based on the second request, a target storage node that can create the storage partition, and the controller forwards the second request to the target storage node, so that the target storage node may generate the identifier of the storage partition based on the second request, and send the identifier of the storage partition to the controller. The controller receives the identifier of the storage partition from the target storage node, and sends the entry that includes the mapping relationship between the identifier of the storage partition and the target storage node to the switch. The switch receives the entry from the controller, and updates the forwarding table based on the entry. In this embodiment of the present disclosure, the controller may send the entry in the forwarding table to the switch. Therefore, after performing a query operation by using the entry in the forwarding table, the switch may directly exchange a request with the plurality of storage nodes, so that an access delay of the client and a request processing delay are reduced.

In some embodiments of the present disclosure, the controller 203 is configured to after receiving the identifier of the storage partition from the target storage node, update a partition mapping table in the controller 203 based on the mapping relationship between the identifier of the storage partition and the target storage node.

The controller is configured to generate and maintain the partition mapping table. The partition mapping table may also be referred to as a storage partition mapping table, or may be referred to as a partition mapping view. The partition mapping table includes a mapping relationship between an identifier of the storage partition and a storage node. The controller sends an entry that includes the mapping relationship between the identifier of the storage partition and the storage node to the switch, and uses the entry as an entry in the forwarding table in the switch. The controller updates the partition mapping table in the controller by using the mapping relationship between the identifier of the storage partition and the target storage node. In other words, the controller may record the mapping relationship between the identifier of the storage partition and the target storage node in the partition mapping table. For example, in the storage system, the controller has a function of a name server, and therefore, the partition mapping table may include a mapping relationship between a virtual name server and a storage node. The controller updates the partition mapping table in the controller by using the mapping relationship between the identifier of the storage partition and the target storage node, so that a mapping relationship between the storage partition and the target storage node can be recorded.

In some embodiments of the present disclosure, the controller 203 is configured to after receiving the identifier of the storage partition from the target storage node, update a storage node status table in the controller 203 based on the mapping relationship between the identifier of the storage partition and the target storage node.

The controller includes the storage node status table, and a storage node status may also be referred to as a storage node status. For example, there are a plurality of storage node statuses, for example, the status includes active, lost, and caching up. The controller may record a real-time status of the storage node in the storage node status table, so that the controller accurately obtains a status of each of the plurality of storage nodes.

It can be learned from example descriptions in the foregoing embodiments that, the switch provided in this embodiment of the present disclosure receives the first request from the client, and queries the entry in the forwarding table based on the first request, to determine the target storage node corresponding to the identifier of the storage partition. In other words, the switch may determine, by using the entry in the forwarding table, the target storage node that is to process the first request, so that overheads of messages between the client and the plurality of storage nodes and a data forwarding amount are reduced. In a manner of querying the entry, a delay of the storage system is reduced, information processing efficiency is improved, and performance of the storage system is improved.

To better understand and implement the foregoing solutions of embodiment of the present disclosure, the following provides detailed descriptions by using a corresponding application scenario as an example.

Figure 3:
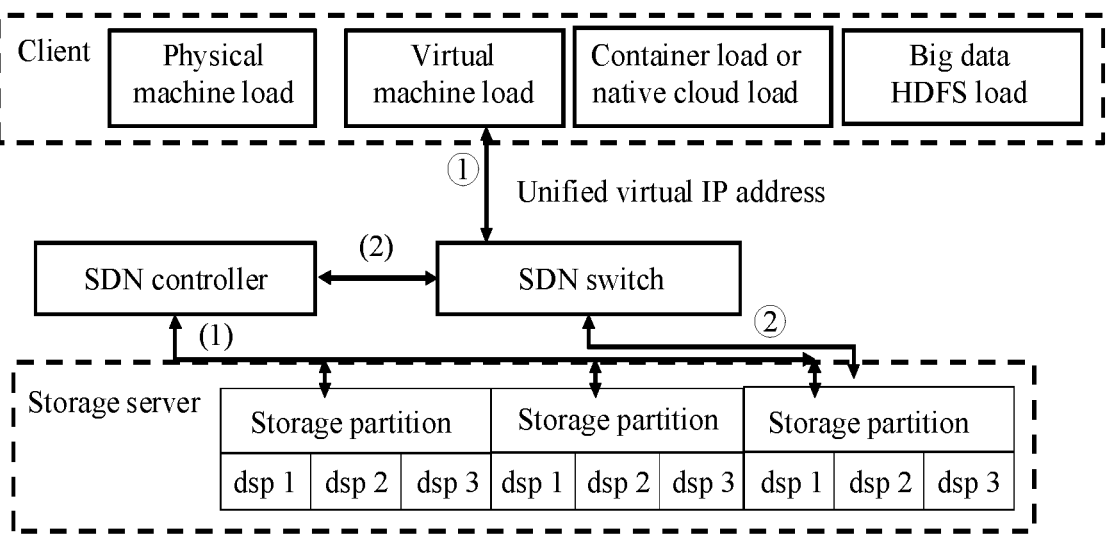
FIG. 3 is a schematic diagram of an application scenario of a storage system according to an embodiment of the present disclosure.

FIG. 3 is a schematic diagram of a system architecture according to an embodiment of the present disclosure. The system architecture may include an SDN controller, an SDN switch, and a server cluster. In a possible implementation, a storage system may further include a client.

The client may be implemented by using a host, and the client may be specifically a physical machine load (workload), a virtual machine load, a container load, a native cloud load, or a big data HDFS load. For example, the client is integrated on a host side, and sends a data read/write request to the SDN switch and receives a response from the SDN switch by using a preset protocol and a preset data address. In an implementation, the data read/write request and the acknowledgment that are sent to the SDN switch include a unified IP address.

The SDN controller may also be referred to as an SDN/SDS controller. The SDN controller may communicate with a data server in the server cluster to generate a partition view, and the partition view is also referred to as a partition mapping table. The partition view includes a mapping relationship between a server partition number and the data server, and an entry that includes the mapping relationship between the server partition number and the data server is updated to the SDN switch by using an OpenFlow protocol. Timing may be performed at intervals of 5 minutes to 60 minutes.

For example, the SDN controller maintains a forwarding table, and the forwarding table includes the entry that includes the mapping relationship between the server partition number and the data server.

Content of the partition mapping table is shown in the following Table 1.

| Logic partition number (Logic Partition No.) 1 | Data server number (Data Server No.) 1 | Server partition number (Partition No.) 1 |
|---|---|---|
| Logic Partition No. 2 | Data Server No. 2 | Server Partition No. 2 |
| Logic Partition No. 3 | Data Server No. 3 | Server Partition No. 3 |

For example, content of a data server status table maintained by the SDN controller is shown in the following Table 2.

| Data server number (Data Server No.) 1 | Internet Protocol address of data server (Data Server IP) 1 | Status 1, including active, lost, and caching up |
|---|---|---|
| Data Server No. 2 | Data Server IP 2 | Status 2, including active, lost, and caching up |
| Data Server No. 3 | Data Server IP 3 | Status 3, including active, lost, and caching up |

The SDN switch sends a corresponding request and a corresponding request processing result by using the entry in the forwarding table.

For example, in addition to the mapping relationship between the server partition number and the data server, the entry in the forwarding table stored in the SDN switch may further include an input port, an output port, and the like.

In this embodiment of the present disclosure, the controller applied to the storage system provides a function of a name server and a function of the SDN controller, maintains a partition view, and delivers an entry that includes the mapping relationship between the server partition and the data server to the SDN switch, so that a plurality of times of interaction between the client and both an original name server and an original data server can be effectively reduced.

Figure 4:
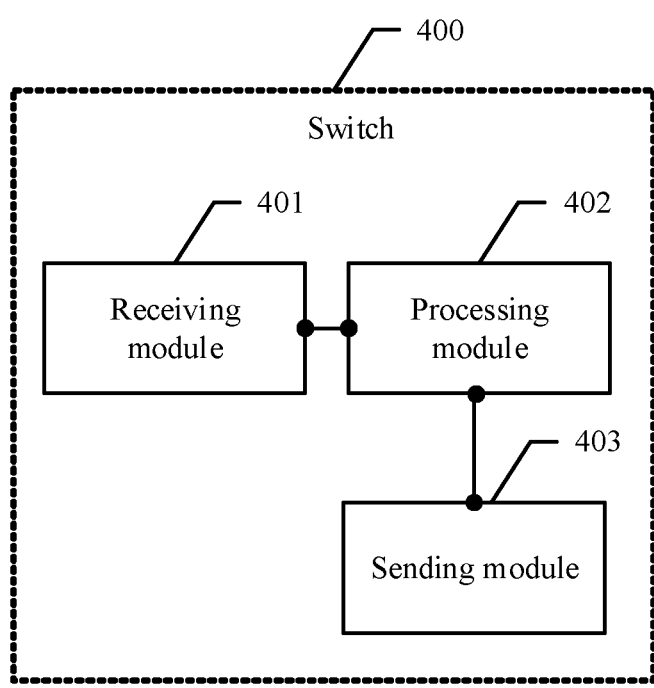
FIG. 4 is a schematic diagram of a component structure of a switch according to an embodiment of the present disclosure.

As shown in FIG. 4, an embodiment of the present disclosure provides a switch 400. The switch is applied to a distributed system, and the distributed system further includes a server cluster and the switch. There is a communication connection between the switch and the server cluster. The switch includes a receiving module 401, a processing module 402, and a sending module 403.

The receiving module is configured to receive a first request from a client, where the first request includes a server partition number.

The processing module is configured to query an entry in a forwarding table in the switch based on the to-be-processed server partition number, to determine a data server corresponding to the service partition number, where the entry includes a mapping relationship between the server partition number and a data server in the server cluster. The sending module is configured to send the first request to a first data server.

In some embodiments of the present disclosure, the receiving module is configured to receive a request processing result from the first data server.

The sending module is configured to send the request processing result to the client.

In some embodiments of the present disclosure, the distributed system further includes a software-defined controller. There is a communication connection between the client and the software-defined controller, and there is a communication connection between the software-defined controller and each of the switch and the server cluster.

The receiving module is configured to receive an entry from the software-defined controller and that includes the mapping relationship between the server partition number and the data server.

The processing module is configured to update the forwarding table based on the entry.

An embodiment of the present disclosure further provides a switch. As shown in FIG. 4, the switch is applied to a storage system, the storage system further includes a plurality of storage nodes, and there are communication connections between the switch and a client and between the switch and the plurality of storage nodes. The switch includes a receiving module configured to receive a first request from the client, where the first request includes an identifier of a storage partition; a processing module configured to query an entry in a forwarding table based on the identifier of the storage partition, to determine a target storage node corresponding to the identifier of the storage partition, where the entry includes a mapping relationship between the identifier of the storage partition and the target storage node, and the target storage node is a storage node in the plurality of storage nodes; and a sending module configured to send the first request to the target storage node.

In some embodiments of the present disclosure, the receiving module is further configured to receive a request processing result from the target storage node based on the first request.

The sending module is further configured to send the request processing result to the client.

In some embodiments of the present disclosure, the storage system further includes a controller. There is a communication connection between the controller and each of the client, the switch, and the plurality of storage nodes.

The receiving module is configured to receive the entry from the controller and that includes the mapping relationship between the identifier of the storage partition and the target storage node, where the identifier of the storage partition is generated by the target storage node, and the target storage node is determined by the controller from the plurality of storage nodes.

The processing module is configured to update the forwarding table based on the entry.

An embodiment of the present disclosure further provides a computer storage medium. The computer storage medium stores a program, and the program is executed to perform some or all of the steps described in the foregoing method embodiments.

Figure 5:
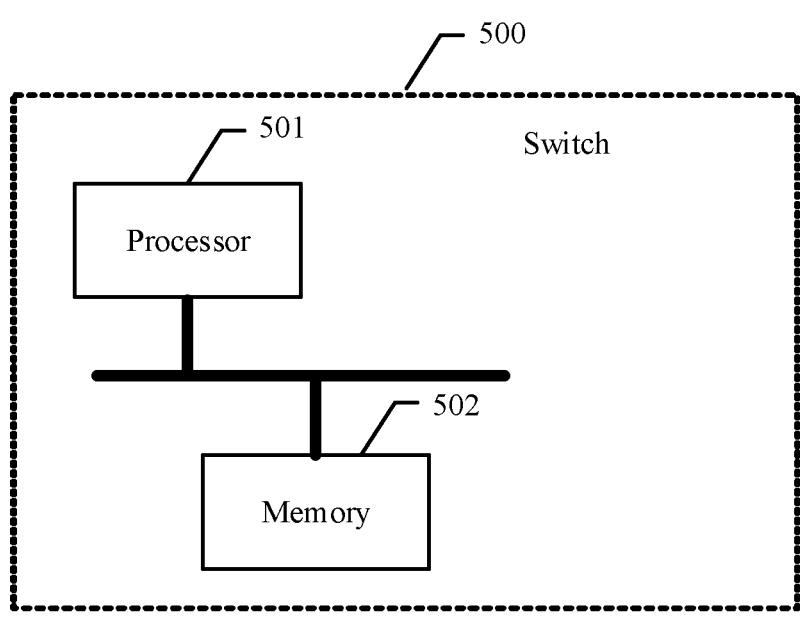
FIG. 5 is a schematic diagram of a component structure of another switch according to an embodiment of the present disclosure.

Another switch provided in an embodiment of the present disclosure is described below. As shown in FIG. 5, the switch 500 includes a processor 501 and a memory 502 (there may be one or more processors 501 in the switch 500, and one processor is used as an example in FIG. 5). In some embodiments of the present disclosure, the processor 501 and the memory 502 may be connected by using a bus or in another manner. In FIG. 5, a bus connection is used as an example.

The memory 502 is configured to store a forwarding table. The processor 501 controls an operation of the switch, and the processor 501 may also be referred to as a central processing unit (CPU). During specific application, the components of the switch are coupled together by using a bus system. In addition to a data bus, the bus system may further include a power bus, a control bus, a status signal bus, and the like. However, for clarity of description, various types of buses in the figure are referred to as the bus system.

The methods disclosed in embodiments of the present disclosure may be applied to the processor 501, or may be implemented by the processor 501. The processor 501 may be an integrated circuit chip and has a signal processing capability. In an implementation process, the steps in the foregoing methods may be completed by using a hardware integrated logic circuit in the processor 501, or by using instructions in a form of software. The processor 501 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor may implement or perform the methods, steps, and logical block diagrams that are disclosed in embodiments of the present disclosure. The general-purpose processor may be a microprocessor, or the processor may be any conventional processor or the like. The steps in the methods disclosed with reference to embodiments of the present disclosure may be directly performed by a hardware decoding processor, or may be performed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 502. The processor 501 reads information in the memory 502 and completes the steps of the foregoing methods in combination with hardware of the processor 501.

In this embodiment of the present disclosure, the processor 501 is configured to perform the request processing method performed by the foregoing switch.

Figure 6:
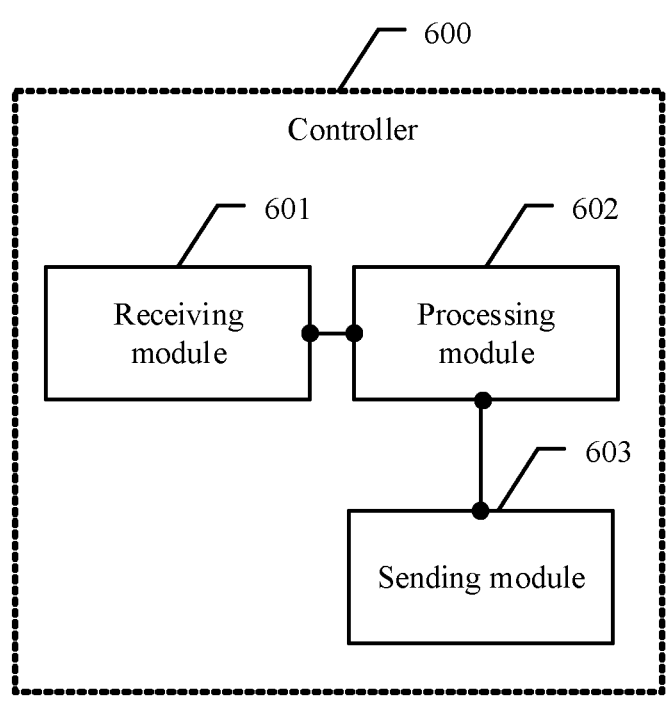
FIG. 6 is a schematic diagram of a component structure of a controller according to an embodiment of the present disclosure.

As shown in FIG. 6, an embodiment of the present disclosure provides a controller 600. The controller is applied to a distributed system, and the distributed system further includes a switch and a server cluster. There is a communication connection between the switch and each of a client and the server cluster. The controller includes a receiving module 601, a processing module 602, and a sending module 603.

The receiving module is configured to receive a second request from the client.

The processing module is configured to determine a target storage node from the plurality of storage nodes based on the second request.

The sending module is configured to send the second request to the target storage node.

The receiving module is further configured to receive an identifier of a storage partition from the target storage node based on the second request.

The sending module is further configured to send an entry that includes a mapping relationship between the identifier of the storage partition and the target storage node to the switch.

In a possible implementation, the processing module is further configured to after receiving the identifier of the storage partition from the target storage node, update a partition mapping table in the controller based on the mapping relationship between the identifier of the storage partition and the target storage node.

In a possible implementation, the processing module is further configured to after receiving the identifier of the storage partition from the target storage node, update a storage node status table in the controller based on the mapping relationship between the identifier of the storage partition and the target storage node.

Figure 7:
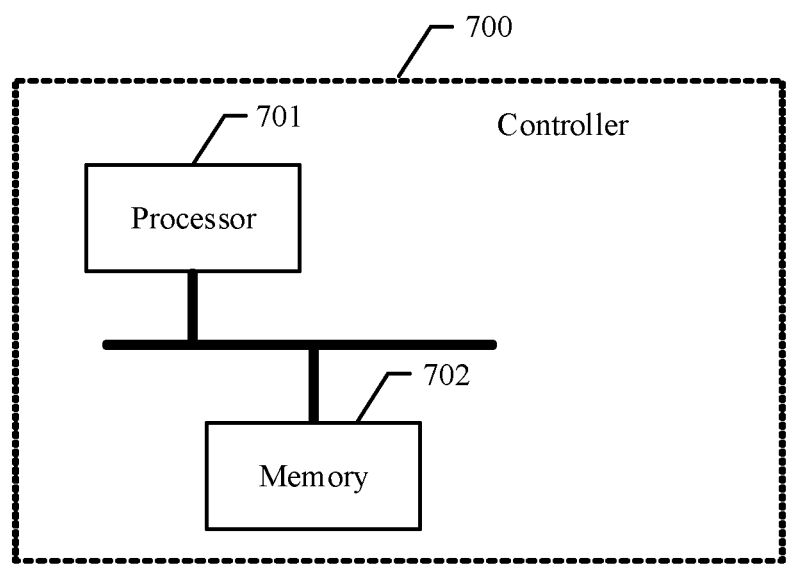
FIG. 7 is a schematic diagram of a component structure of another controller according to an embodiment of the present disclosure.

The following describes another controller provided in an embodiment of the present disclosure. As shown in FIG. 7, the controller 700 includes a processor 701 and a memory 702 (there may be one or more processors 701 in the controller 700, and one processor is used as an example in FIG. 7). The processor 701 and the memory 702 may be connected by using a bus or in another manner. In FIG. 7, a bus connection is used as an example.

The memory 702 may include a read-only memory and a random access memory, and provide instructions and data for the processor 701. A part of the memory 702 may further include a non-volatile random-access memory (NVRAM). The memory 702 stores an operating system and operation instructions, an executable module or a data structure, a subset thereof, or an extended set thereof. The operation instructions may include various operation instructions to implement various operations. The operating system may include various system programs, to implement various basic services and process hardware-based tasks.

The processor 701 controls an operation of the controller, and the processor 701 may also be referred to as a CPU. During specific application, the components of the controller are coupled together by using a bus system. In addition to a data bus, the bus system may further include a power bus, a control bus, a status signal bus, and the like. However, for clarity of description, various types of buses in the figure are referred to as the bus system.

The methods disclosed in embodiments of the present disclosure may be applied to the processor 701, or may be implemented by the processor 701. The processor 701 may be an integrated circuit chip and has a signal processing capability. In an implementation process, the steps in the foregoing methods may be completed by using a hardware integrated logic circuit in the processor 701, or by using instructions in a form of software. The processor 701 may be a general-purpose processor, a DSP, an ASIC, an FPGA or another programmable logic device, a discrete gate or a transistor logic device, or a discrete hardware component. The processor may implement or perform the methods, steps, and logical block diagrams that are disclosed in embodiments of the present disclosure. The general-purpose processor may be a microprocessor, or the processor may be any conventional processor or the like. The steps in the methods disclosed with reference to embodiments of the present disclosure may be directly performed by a hardware decoding processor, or may be performed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 702. The processor 701 reads information in the memory 702 and completes the steps of the foregoing methods in combination with hardware of the processor 701.

In this embodiment of the present disclosure, the processor 701 is configured to perform the request processing method performed by the foregoing controller.

It should be noted that content, such as information exchange between the modules/units of the apparatus and the execution processes thereof, is based on a same concept as the method embodiments of the present disclosure, and achieves same technical effects as the method embodiments of the present disclosure. For specific content, refer to the foregoing descriptions in the method embodiments of the present disclosure.

In another possible design, when the switch or the controller is a chip in a terminal, the chip includes a processing unit and a communication unit. The processing unit may be, for example, a processor, and the communication unit may be, for example, an input/output interface, a pin, or a circuit. The processing unit may execute computer execution instructions stored in the storage unit, so that the chip in the terminal performs any method of the foregoing switch or controller. Optionally, the storage unit is a storage unit in the chip, for example, a register or a cache. Alternatively, the storage unit may be a storage unit that is in the terminal and that is located outside the chip, for example, a read-only memory (ROM) or another type of static storage device that may store static information and instructions, for example, a random access memory (RAM).

The processor mentioned above may be a general-purpose CPU, a microprocessor, an ASIC, or one or more integrated circuits configured to control program execution of the foregoing methods.

In addition, it should be noted that the described apparatus embodiments are merely examples. The units described as separate parts may or may not be physically separate, and parts displayed as units may or may not be physical units, that is, may be located in one position, or may be distributed on a plurality of network units. Some or all the modules may be selected according to an actual need to achieve the objectives of the solutions of embodiments. In addition, in the accompanying drawings of the apparatus embodiments provided in the present disclosure, connection relationships between modules indicate that the modules have communication connections to each other, which may be further implemented as one or more communications buses or signal cables.

Based on the descriptions of the foregoing implementations, a person skilled in the art may clearly understand that the present disclosure may be implemented by software in addition to necessary universal hardware, or certainly may be implemented by dedicated hardware, including an ASIC, a dedicated CPU, a dedicated memory, a dedicated component, and the like. Generally, all functions that can be completed by a computer program can be easily implemented by using corresponding hardware, and a specific hardware structure used to implement a same function may be in various forms, for example, in a form of an analog circuit, a digital circuit, or a dedicated circuit. However, in the present disclosure, a software program implementation is generally a better implementation. Based on such an understanding, the technical solutions of the present disclosure may be implemented, in whole or in part, in the form of a software product. The computer software product is stored in a readable storage medium, such as a floppy disk, a Universal Serial Bus (USB) flash drive, a removable hard disk, a ROM, a RAM, a magnetic disk, or a compact disc of a computer, and includes several instructions for instructing a computer device (which may be a personal computer, a server, a network device, or the like) to perform the methods described in embodiments of the present disclosure.

All or some of embodiments may be implemented by software, hardware, firmware, or any combination thereof. When software is used to implement embodiments, all or some of embodiments may be implemented in a form of a computer program product.

The computer program product includes one or more computer instructions. When the computer program instructions are loaded and executed on a computer, all or some of the procedures or the functions in embodiments of the present disclosure are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

What is claimed is:

1. A storage system comprising:
   a plurality of storage nodes comprising a target storage node;
   a switch configured to:
      receive a first request from a client, wherein the first request comprises an identifier of a storage partition;

query an entry in a forwarding table based on the identifier to determine the target storage node in the plurality of storage nodes, wherein the entry comprises a mapping relationship between the identifier and the target storage node; and
      send the first request to the target storage node; and
   a controller configured to:
      receive a second request from the client;
      determine the target storage node in the plurality of storage nodes based on the second request; and
      send the second request to the target storage node,
   wherein the target storage node is configured to:
      receive the second request from the controller;
      generate the identifier of the storage partition based on the second request; and
      send the identifier to the controller,
   wherein the controller is further configured to:
      receive the identifier from the target storage node; and
      send the entry that comprises the mapping relationship between the identifier and
   the target storage node to the switch, and
   wherein the switch is further configured to:
      receive the entry from the controller; and
      update the forwarding table based on the entry.

2. The storage system of claim 1, wherein the target storage node is configured to:
   receive the first request from the switch;
   generate a request processing result based on the first request; and
   send the request processing result to the switch, and
   wherein the switch is further configured to:
      receive the request processing result; and
      send the request processing result to the client.

3. The storage system of claim 1, wherein the target storage node is further configured to:
   allocate a storage resource from a server partition corresponding to the identifier of the storage partition based on the first request when the first request is a data write request; and
   send an address of the target storage node to the switch; and the switch is further configured to:
      receive the address of the target storage node; and
      send a response message comprising the address of the target storage node to the client.

4. The storage system of claim 1, wherein the controller is further configured to update a partition mapping table in the controller based on the mapping relationship.

5. The storage system of claim 1, wherein the controller is further configured to update a storage node status table in the controller based on the mapping relationship.

6. A request processing method implemented by a storage system comprising a switch and a plurality of storage nodes, wherein the plurality of storage nodes comprises a target storage node, and wherein the request processing method comprises:
   receiving, by the switch, a first request from a client, wherein the first request comprises an identifier of a storage partition;
   querying, by the switch, an entry in a forwarding table based on the identifier to determine the target storage node in the plurality of storage nodes, wherein the entry comprises a mapping relationship between the identifier and the target storage node;
   sending, by the switch, the first request to the target storage node;
   receiving, by the target storage node, the first request from the switch;

receiving, by a controller of the storage system, a second request from the client;

determining, by the controller, the target storage node in the plurality of storage nodes based on the second request;

sending, by the controller, the second request to the target storage node;

receiving, by the target storage node, the second request from the controller;

generating, by the target storage node, the identifier of the storage partition based on the second request;

sending, by the target storage node, the identifier to the controller;

receiving, by the controller, the identifier from the target storage node;

sending, by the controller, the entry that comprises the mapping relationship between the identifier and the target storage node to the switch; and receiving, by the switch, the entry from the controller, and updating the forwarding table based on the entry.

7. The request processing method of claim 6, further comprising:

generating, by the target storage node, a request processing result based on the first request;

sending, by the target storage node, the request processing result to the switch; and receiving, by the switch, the request processing result, and sending the request processing result to the client.

8. The request processing method of claim 6, further comprising:

allocating, by the target storage node, a storage resource from a server partition corresponding to the identifier of the storage partition based on the first request when the first request is a data write request;

sending, by the target storage node, an address of the target storage node to the switch;

receiving, by the switch, the address of the target storage node; and sending, by the switch, a response message comprising the address of the target storage node to the client.

9. The request processing method of claim 8, further comprising updating, by the controller, a partition mapping table in the controller based on the mapping relationship.

10. The request processing method of claim 8, further comprising updating, by the controller, a storage node status table in the controller based on the mapping relationship.

11. The storage system of claim 1, wherein the target storage node is further configured to:

read data from the storage partition based on the first request to obtain read data when the first request is a data read request; and send the read data to the switch.

12. The storage system of claim 3, wherein the switch is further configured to:

receive a data write command from the client, wherein the data write command comprises to-be-written data; and send the data write command to the target storage node based on the forwarding table.

13. The storage system of claim 12, wherein the target storage node is further configured to:

write the to-be-written data to the storage resource based on the data write command; and send a data write result to the switch; and wherein the switch is further configured to:

receive the data write result; and send the data write result to the client.

14. The storage system of claim 4, wherein the controller has a function of a name server, and wherein the partition mapping table comprises a mapping relationship between a virtual name server and a storage node.

15. The storage system of claim 1, wherein the entry in the forwarding table further comprises an input port and an output port corresponding to the target storage node.

16. The request processing method of claim 6, wherein the target storage node is further configured to:

read data from the storage partition based on the first request to obtain read data when the first request is a data read request; and send the read data to the switch.

17. The request processing method of claim 8, wherein the switch is further configured to:

receive a data write command from the client, wherein the data write command comprises to-be-written data; and send the data write command to the target storage node based on the forwarding table.

18. The request processing method of claim 17, wherein the target storage node is further configured to:

write the to-be-written data to the storage resource based on the data write command; and send a data write result to the switch; and wherein the switch is further configured to:

receive the data write result; and send the data write result to the client.

19. The request processing method of claim 9, wherein the controller has a function of a name server, and wherein the partition mapping table comprises a mapping relationship between a virtual name server and a storage node.

20. The request processing method of claim 6, wherein the entry in the forwarding table further comprises an input port and an output port corresponding to the target storage node.

* * * * *